(12) United States Patent
Gitter et al.

(10) Patent No.: US 10,248,105 B2
(45) Date of Patent: Apr. 2, 2019

(54) MAIN CONTROLLER FOR TELEMATICS INTEGRATION

(71) Applicant: ILLINOIS TOOL WORKS INC., Glenview, IL (US)

(72) Inventors: Joe Gitter, New London, WI (US); Kyle Andrew Pfeifer, Appleton, WI (US); Ben Froland, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 243 days.

(21) Appl. No.: 15/070,888

(22) Filed: Mar. 15, 2016

(65) Prior Publication Data

US 2016/0274568 A1  Sep. 22, 2016

Related U.S. Application Data

(60) Provisional application No. 62/134,417, filed on Mar. 17, 2015.

(51) Int. Cl.
*G06F 19/00* (2018.01)
*G05B 19/404* (2006.01)
(Continued)

(52) U.S. Cl.
CPC .......... *G05B 19/404* (2013.01); *B23K 9/0953* (2013.01); *B23K 9/0956* (2013.01);
(Continued)

(58) Field of Classification Search
CPC ...................................................... G05B 11/42
(Continued)

(56) References Cited

U.S. PATENT DOCUMENTS 6,459,989 B1  10/2002  Kirkpatrick et al.
6,797,921 B1 *  9/2004  Niedereder .......... B23K 9/1062
                                                    219/130.5
(Continued)

FOREIGN PATENT DOCUMENTS

EP  1229343  8/2002
EP  1681122  7/2006
(Continued)

OTHER PUBLICATIONS

International Search Report and Written Opinion for PCT/US2016/022581, dated Jun. 24, 2016 (15 pages).

*Primary Examiner* — Suresh Suryawanshi
(74) *Attorney, Agent, or Firm* — McAndrews, Held & Malloy, Ltd.

(57) ABSTRACT

A main controller may be used to provide integrated, centralized, and optimized handling of telematics data in welding arrangements. The main controller may receive from other components of a welding arrangement, telematics data, and may apply at least some processing to the telematics data, to enable use of the telematics data by a remote entity. The telematics data may comprises data relating to an engine used in driving one or more components of the welding arrangement, data relating to one or more components of the welding arrangement, and/or data relating to welding operations performed via the welding arrangement. The processing of telematics data may comprise formatting data in accordance with a single standard format, digitizing analog data, and/or processing data for communication to the remote entity. The main controller may provide telematics client and/or host node functions, such as based on the controller area network (CANBus) protocol.

19 Claims, 11 Drawing Sheets

(51) Int. Cl.
  *B23K 9/095* (2006.01)
  *B23K 9/10* (2006.01)
  *B23K 37/00* (2006.01)
  *H04L 29/08* (2006.01)

(52) U.S. Cl.
  CPC ............ *B23K 9/1087* (2013.01); *B23K 37/00* (2013.01); *H04L 67/025* (2013.01); *H04L 67/10* (2013.01); *H04L 67/12* (2013.01); *G05B 2219/45135* (2013.01)

(58) Field of Classification Search
  USPC .......................................................... 700/207
  See application file for complete search history.

(56) References Cited

U.S. PATENT DOCUMENTS

| | | | | |
|---|---|---|---|---|
| 8,416,067 | B2* | 4/2013 | Davidson | G06Q 10/08 340/426.1 |
| 8,686,318 | B2* | 4/2014 | Albrecht | B23K 9/10 219/130.01 |
| 8,748,776 | B2* | 6/2014 | Albrecht | B23K 9/10 219/130.01 |
| 8,928,495 | B2* | 1/2015 | Hassib | G06F 17/00 340/540 |
| 9,129,330 | B2* | 9/2015 | Albrecht | G06Q 30/0633 |
| 9,712,947 | B2* | 7/2017 | Dina | H04W 4/008 |
| 9,718,141 | B2* | 8/2017 | Denis | B23K 9/1043 |
| 2002/0119770 | A1 | 8/2002 | Twitchell, Jr. | |
| 2002/0168937 | A1 | 11/2002 | Clark et al. | |
| 2003/0094487 | A1 | 5/2003 | Blankenship et al. | |
| 2004/0000498 | A1 | 1/2004 | Weissbrod | |
| 2005/0110636 | A1 | 5/2005 | Ghaffari | |
| 2005/0275531 | A1 | 12/2005 | Johnson | |
| 2006/0070987 | A1 | 4/2006 | Daniel | |
| 2006/0071782 | A1 | 4/2006 | Ahmed et al. | |
| 2006/0173619 | A1 | 8/2006 | Brant et al. | |
| 2007/0080149 | A1* | 4/2007 | Albrecht | B23K 9/10 219/130.01 |
| 2007/0080152 | A1* | 4/2007 | Albrecht | B23K 9/10 219/130.01 |
| 2007/0080153 | A1* | 4/2007 | Albrecht | B23K 9/10 219/130.01 |
| 2010/0057592 | A1* | 3/2010 | Moir | G01G 23/3735 705/29 |
| 2014/0190248 | A1* | 7/2014 | Moran | G01W 1/02 73/170.17 |
| 2014/0278243 | A1 | 9/2014 | Lamers et al. | |
| 2016/0167153 | A1* | 6/2016 | Denis | B23K 9/1087 219/132 |

FOREIGN PATENT DOCUMENTS

| | | |
|---|---|---|
| GB | 2496686 | 5/2013 |
| WO | 0207014 | 1/2002 |
| WO | 02086656 | 10/2002 |
| WO | 2007044135 | 4/2007 |
| WO | 2008030680 | 3/2008 |

* cited by examiner

MAIN CONTROLLER FOR TELEMATICS INTEGRATION

CLAIM OF PRIORITY

This patent application makes reference to, claims priority to and claims benefit from U.S. provisional patent application Ser. No. 62/134,417, filed Mar. 17, 2015. The above identified application is hereby incorporated herein by reference in its entirety.

BACKGROUND

Welding has increasingly become ubiquitous in all industries. Welding can be performed in automated manner or in manual manner (e.g., being performed by a human). However, while welding may be automated in certain contexts, a large number of applications continue to exist where manual welding operations are used (e.g., where a welding operator uses a welding gun or torch to perform the welding). In either mode (automated or manual), the success of welding operations relies heavily on proper use of the welding equipment.

BRIEF SUMMARY

Various implementations of the present disclosure are directed to main controller for telematics integration, substantially as illustrated by or described in connection with at least one of the figures, as set forth more completely in the claims.

DETAILED DESCRIPTION

Figure 1:
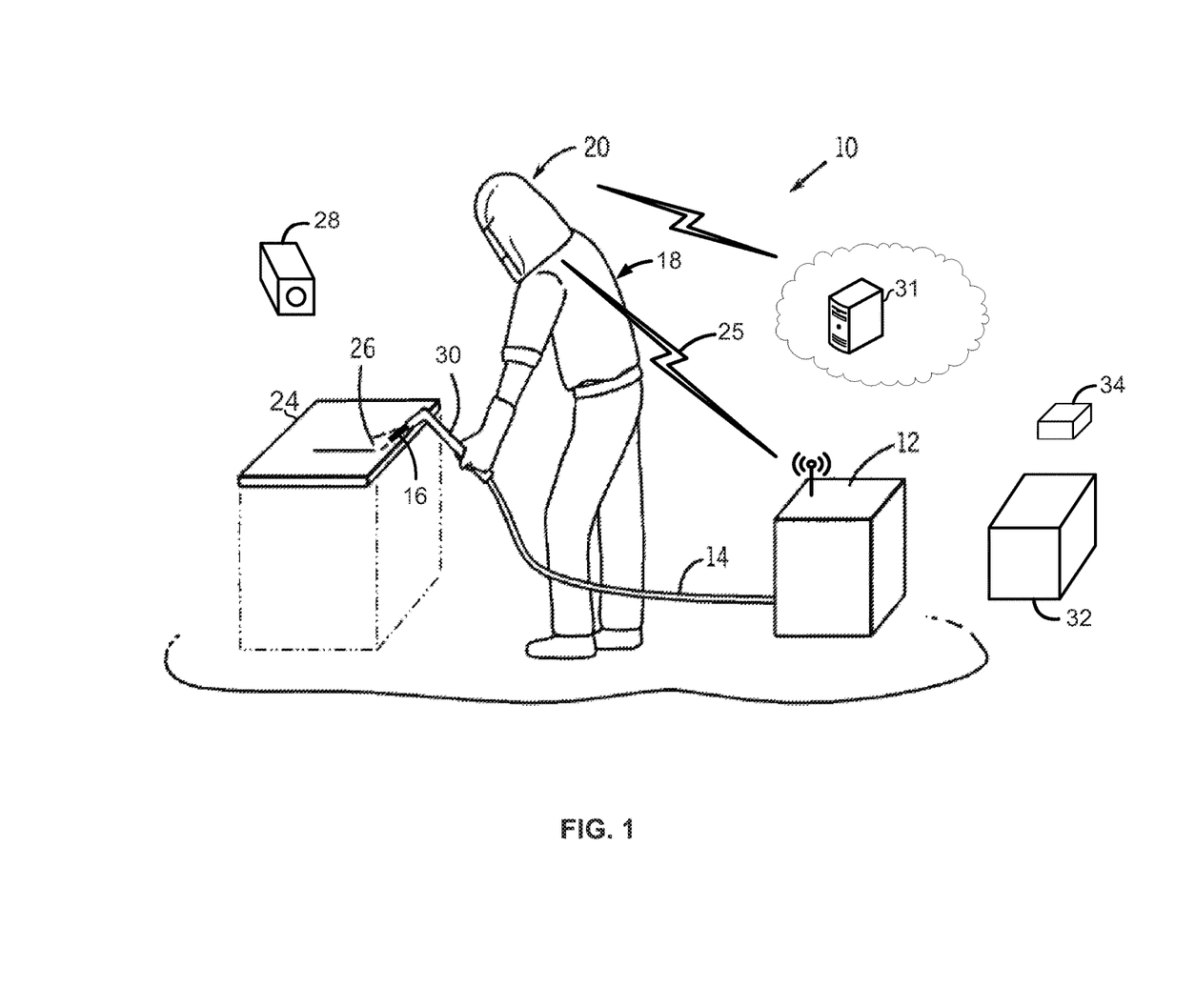
FIG. 1 shows an example system that may be used for welding-type operations, in accordance with aspects of the present disclosure.

FIG. 1 shows an example system that may be used for welding-type operations, in accordance with aspects of this disclosure. In this regard, "welding-type" operations may comprise operations in accordance with any known welding technique, including flame welding techniques such as oxy-fuel welding, electric welding techniques such as shielded metal arc welding (i.e., stick welding), metal inert gas welding (MIG), tungsten inert gas welding (TIG), resistance welding, as well as gouging (e.g., carbon arc gouging), cutting (e.g., plasma cutting), brazing, induction heating, soldering, and/or the like. Referring to FIG. 1, there is shown an example welding arrangement 10 in which an operator 18 is wearing welding headwear 20 and welding a workpiece 24 using a torch 30 to which power is delivered by equipment 12 via a conduit 14, with weld monitoring equipment 28, which may be available for use in monitoring welding operations. The equipment 12 may comprise a power source, optionally a source of an inert shield gas and, where wire/filler material is to be provided automatically, a wire feeder. Further, in some instances an engine 32 may be used to drive equipment or components used during welding operations. For example, the engine 32 may drive generators, power sources, etc. used during welding operations.

The welding arrangement 10 of FIG. 1 may be configured to form a weld joint by any known welding-type technique.

Optionally in any embodiment, the welding equipment 12 may be arc welding equipment that provides a direct current (DC) or alternating current (AC) to a consumable or non-consumable electrode 16 of a torch 30. The electrode 16 delivers the current to the point of welding on the workpiece 24. In the welding arrangement 10, the operator 18 controls the location and operation of the electrode 16 by manipulating the torch 30 and triggering the starting and stopping of the current flow. When current is flowing, an arc 26 is developed between the electrode and the workpiece 24. The conduit 14 and the electrode 16 thus deliver current and voltage sufficient to create the electric arc 26 between the electrode 16 and the workpiece. The arc 26 locally melts the workpiece 24 and welding wire or rod supplied to the weld joint (the electrode 16 in the case of a consumable electrode or a separate wire or rod in the case of a non-consumable electrode) at the point of welding between electrode 16 and the workpiece 24, thereby forming a weld joint when the metal cools.

Optionally in any embodiment, the weld monitoring equipment 28 may be used to monitor welding operations. The weld monitoring equipment 28 may be used to monitor various aspects of welding operations, particularly in real-time (that is as welding is taking place). For example, the weld monitoring equipment 28 may be operable to monitor arc characteristics such as length, current, voltage, frequency, variation, and instability. Data obtained from the weld monitoring may be used (e.g., by the operator 18 and/or by an automated quality control system) to ensure proper welding.

As shown, the equipment 12 and headwear 20 may communicate via a link 25 via which the headwear 20 may control settings of the equipment 12 and/or the equipment 12 may provide information about its settings to the headwear 20. Although a wireless link is shown, the link may be wireless, wired, or optical.

Optionally in any embodiment, equipment or components used during welding operations may be driven using engines. For example, the engine 32 may drive generators, power sources, etc. used during welding operations. In some instances, it may be desired to obtain information relating to used engines. For example, data relating to engines (and operations thereof) used during welding operations may be collected and used (e.g., based on analysis thereof) in monitoring and optimizing operations of these engines. The collection and use of such data may be performed telematically—that is, the data may be collected locally, subjected to at least some processing locally (e.g., formatting, etc.), and then may be communicated to remote management entities (e.g., centralized management locations, engine providers, etc.), using wireless technologies (e.g., cellular, satellite, etc.). In various example embodiments, a dedicated controller (e.g., shown as element 34 in FIG. 1) may be used to control, centralize, and/or optimize data handling operations. The controller 34 may comprise suitable circuitry, hardware, software, or any combination thereof for use in performing various aspects of the engine related data handling operations. For example, the controller 34 may be operable to interface with the engine 32 to obtain data related thereto. The interfacing (or obtaining data) may be done via analog sensors and/or via electronic engine control unit (ECU) if one is present. Further, the controller 34 may be operable to track or obtain welding related data (e.g., from weld monitoring equipment 28, from equipment 12, etc.). The controller 34 may then transmit the data (e.g., both engine related and weld related data), such as to facilitate remote monitoring and/or management, by way of wireless communications. In particular, this may be done by use of cellular and or satellite telematics hardware, for example. An example implementation is described in more detail with respect to FIG. 3.

Figure 2:
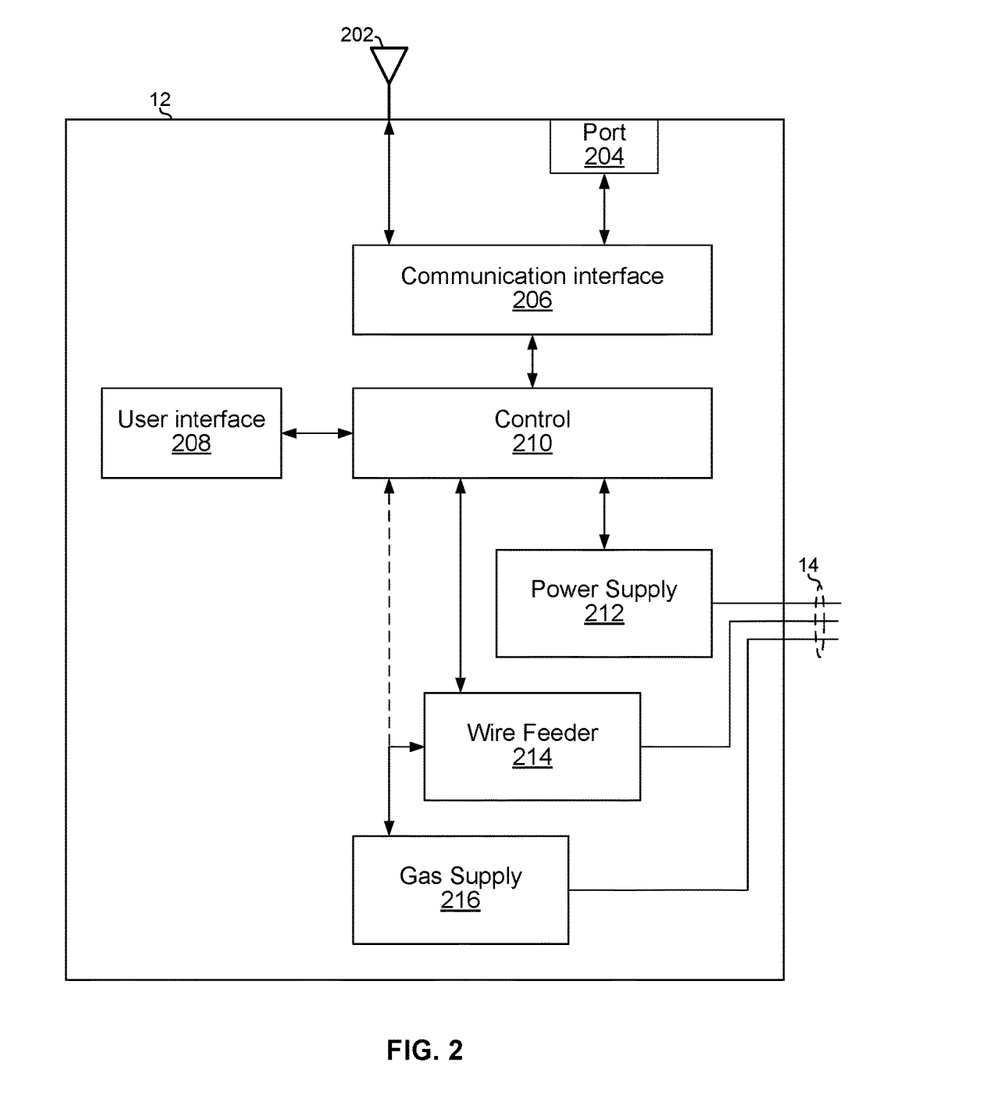
FIG. 2 shows example welding equipment in accordance with aspects of the present disclosure.

FIG. 2 shows example welding equipment in accordance with aspects of this disclosure. The equipment 12 of FIG. 2 comprises an antenna 202, a communication port 204, communication interface circuitry 206, user interface module 208, control circuitry 210, power supply circuitry 212, wire feeder module 214, and gas supply module 216.

The antenna 202 may be any type of antenna suited for the frequencies, power levels, etc. used by the communication link 25.

The communication port 204 may comprise, for example, an Ethernet over twisted pair port, a USB port, an HDMI port, a passive optical network (PON) port, and/or any other suitable port for interfacing with a wired or optical cable.

The communication interface circuitry 206 is operable to interface the control circuitry 210 to the antenna 202 and/or port 204 for transmit and receive operations. For transmit, the communication interface 206 may receive data from the control circuitry 210 and packetize the data and convert the data to physical layer signals in accordance with protocols in use on the communication link 25. For receive, the communication interface may receive physical layer signals via the antenna 202 or port 204, recover data from the received physical layer signals (demodulate, decode, etc.), and provide the data to control circuitry 210.

The user interface module 208 may comprise electromechanical interface components (e.g., screen, speakers, microphone, buttons, touchscreen, etc.) and associated drive circuitry. The user interface 208 may generate electrical signals in response to user input (e.g., screen touches, button presses, voice commands, etc.). Driver circuitry of the user interface module 208 may condition (e.g., amplify, digitize, etc.) the signals and them to the control circuitry 210. The user interface 208 may generate audible, visual, and/or tactile output (e.g., via speakers, a display, and/or motors/actuators/servos/etc.) in response to signals from the control circuitry 210.

The control circuitry 210 comprises circuitry (e.g., a microcontroller and memory) operable to process data from the communication interface 206, the user interface 208, the power supply 212, the wire feeder 214, and/or the gas supply 216; and to output data and/or control signals to the communication interface 206, the user interface 208, the power supply 212, the wire feeder 214, and/or the gas supply 216.

The power supply circuitry 212 comprises circuitry for generating power to be delivered to a welding electrode via conduit 14. The power supply circuitry 212 may comprise, for example, one or more voltage regulators, current regulators, inverters, and/or the like. The voltage and/or current output by the power supply circuitry 212 may be controlled by a control signal from the control circuitry 210. The power supply circuitry 212 may also comprise circuitry for reporting the present current and/or voltage to the control circuitry 210. In an example implementation, the power supply circuitry 212 may comprise circuitry for measuring the voltage and/or current on the conduit 14 (at either or both ends of the conduit 14) such that reported voltage and/or current is actual and not simply an expected value based on calibration.

The wire feeder module 214 is configured to deliver a consumable wire electrode 16 to the weld joint. The wire feeder 214 may comprise, for example, a spool for holding the wire, an actuator for pulling wire off the spool to deliver to the weld joint, and circuitry for controlling the rate at which the actuator delivers the wire. The actuator may be controlled based on a control signal from the control circuitry 210. The wire feeder module 214 may also comprise circuitry for reporting the present wire speed and/or amount of wire remaining to the control circuitry 210. In an example implementation, the wire feeder module 214 may comprise circuitry and/or mechanical components for measuring the wire speed, such that reported speed is actual and not simply an expected value based on calibration.

The gas supply module 216 is configured to provide shielding gas via conduit 14 for use during the welding process. The gas supply module 216 may comprise an electrically controlled valve for controlling the rate of gas flow. The valve may be controlled by a control signal from control circuitry 210 (which may be routed through the wire feeder 214 or come directly from the control 210 as indicated by the dashed line). The gas supply module 216 may also comprise circuitry for reporting the present gas flow rate to the control circuitry 210. In an example implementation, the gas supply module 216 may comprise circuitry and/or mechanical components for measuring the gas flow rate such that reported flow rate is actual and not simply an expected value based on calibration.

Figure 3:
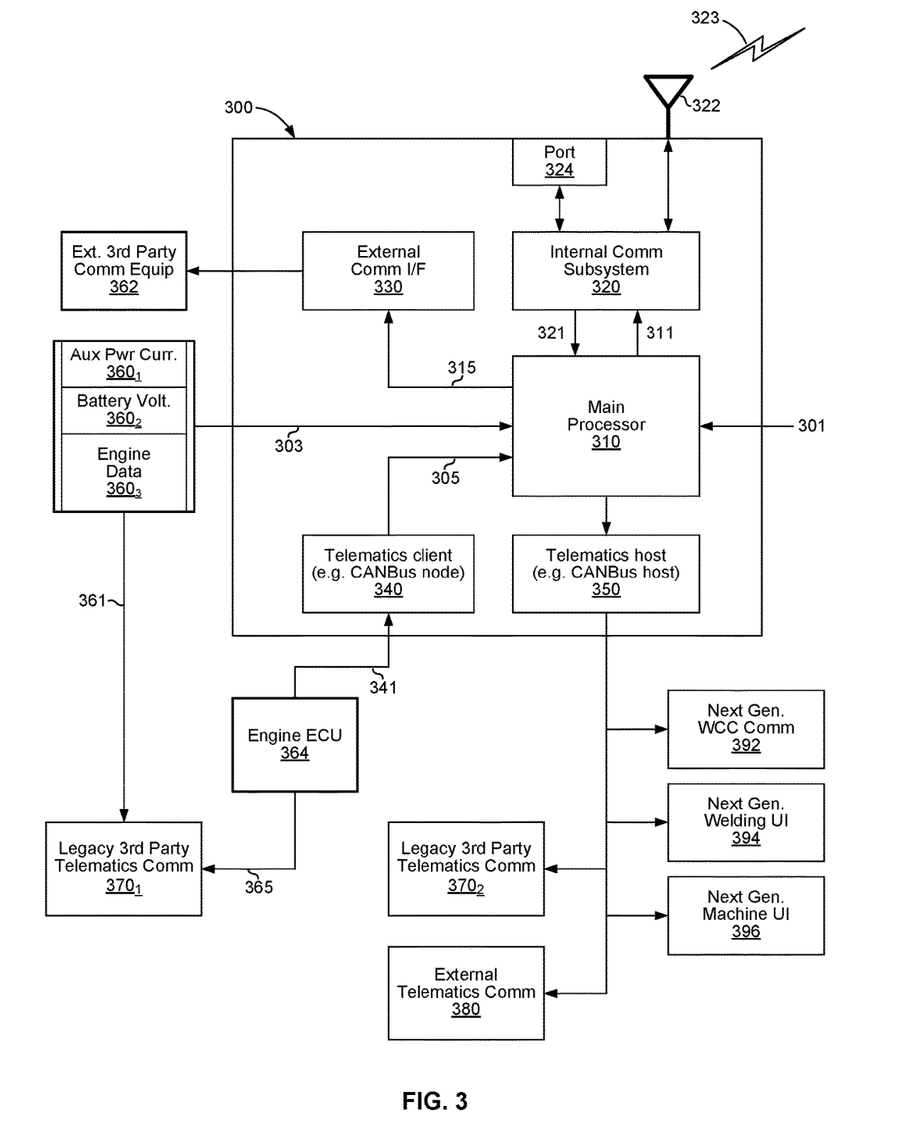
FIG. 3 is a block diagram illustrating an example main controller system for telematics integration, in accordance with aspects of the present disclosure.

FIG. 3 is a block diagram illustrating an example main controller system for telematics integration, in accordance with aspects of the present disclosure. Shown in FIG. 3 is a main controller 300, one or more engine sensors 360, external 3rd party communication equipment 362, an engine control unit (ECU) 364, legacy 3rd party telematics units 370$_1$ and 370$_2$, external telematics unit 380, and one or more additional pieces of equipment which may use or be affected by telematics information (including, e.g., "next generation" equipment, such as next generation weld control communication (WCC) unit 392, next generation welding user interface (UI) 394, next generation machine user interface (UI) 396, etc.).

Each of the one or more engine sensors 360 may comprise suitable hardware, software, or combination thereof for collecting and/or outputting sensory data relating to engines, operations thereof, environmental or operational parameters affecting the engines, and/or components used in conjunction with engines and/or affect the engines' operations. For example the sensors 360 may comprise an auxiliary power transformer sensor $360_1$, a battery voltage sensor $360_2$, and one or more engine sensors $360_3$ (which may provide sensory readings relating to such parameters or components as coolant temperature, level (low) coolant, oil pressure, oil sender, fuel sender, oil sender switch, etc.). The sensors 360 (and data generated thereby) may be analog.

The main controller 300 may comprise suitable hardware, software, or combination thereof for providing main control functions for telematics integration. For example, the main controller 300 may comprise a main processor 310, an internal communication subsystem 320, an external communication interface component 330, a telematics client component 340, and a telematics host component 350.

The main processor 310 is operable to process data, execute particular tasks or functions (e.g., relating to operations performed by the main controller 300), and/or control operations of other components in the main controller 300. The main processor 310 may be a general purpose processor (e.g., CPU), a special purpose processor (e.g., ASIC), etc. The disclosure is not limited to a particular type of processor, however.

For example, the main processor 310 may receive data associated with telematics related functions or operations, and may process that data (e.g., including formatting the data based on an applicable formatting standard), such as for wireless communication to remote telematics monitoring and/or management entities. In this regard, the main controller 300 may comprise suitable interface components (e.g., circuitry, hardware, software, or any combination thereof) for facilitating reception of the telematics related data and/or for enabling interactions with components or devices providing that data. The telematics related data may comprise digital and/or analog data, and may comprise location, machine status, service info, engine sensor data, error codes, and other data available to the main controller 300. The data may include, for example, welding related data 301, sensory related data 303, and/or telematics data obtained from ECUs or 3rd party telematics units. In this regard, the telematics client component 340 may be configured to function as a telematics node, such as a controller area network (CANBus) node, to communicate with ECUs (e.g., the electronic ECU 364). The communications may for example use a CANBus based communication protocol to obtain engine data 341 provided by the electronic ECU 364. The data may then be input (as input signal 305) into the main processor 310.

Once the telematics related data is collected and processed (including formatting) for communication, the main processor 310 may communicate (e.g., wirelessly) the processed-for-communication telematics data using available communication components. For example, where an internal communication component is present (e.g., internal communication subsystem 320), the processed-for-communication telematics data may be forwarded to that component, via corresponding control signals 311, for transmission thereby. Alternatively, where external communication components are used (e.g., the external 3rd party communication equipment 362), the processed-for-communication telematics data may be sent to these components, such as via the external communication interface component 330. In this scenario, the external communication component 330 may receive the processed-for-communication telematics data as signal 315, and apply any necessary processing (e.g., TCP/IP processing) to facilitate communication to the external equipment 362.

The internal communication subsystem 320 may comprise suitable circuitry operable to handle communications in the main controller 300. The internal communication subsystem 320 may comprise, for example, a transceiver configured to support various wired or wireless technologies. For example, the internal communication subsystem 320 may be operable to configure, setup, and/or use wired and/or wireless connections, such as over suitable wired/wireless interface(s) and in accordance with wireless and/or wired protocols or standards supported in the device, to facilitate transmission and/or reception of signals (e.g., carrying data). Further, the internal communication subsystem 320 may be operable to process transmitted and/or received signals, in accordance with applicable wired or wireless technologies. Examples of wireless technologies that may be supported and/or used by the internal communication subsystem 320 may comprise wireless personal area network (WPAN), such as Bluetooth (IEEE 802.15); near field communication (NFC); wireless local area network (WLAN), such as WiFi (IEEE 802.11); cellular technologies, such as 2G/2G+(e.g., GSM/GPRS/EDGE, and IS-95 or cdmaOne) and/or 3G/3G+(e.g., CDMA2000, UMTS, and HSPA); 4G, such as WiMAX (IEEE 802.16) and LTE; Ultra-Wideband (UWB); etc. Examples of wired technologies that may be supported and/or used by the internal communication subsystem 320 comprise Ethernet (IEEE 802.3), Universal Serial Bus (USB) based interfaces, etc. Examples of signal processing operations that may be performed by the main controller 300 comprise, for example, filtering, amplification, analog-to-digital conversion and/or digital-to-analog conversion, up-conversion/down-conversion of baseband signals, encoding/decoding, encryption/decryption, modulation/demodulation, etc.

In conjunction with telematics related operations in the main controller 300, the internal communication subsystem 320 may preferably support and/or utilize wireless technologies that are suitable from long range communications, including with remote peers—e.g., satellite communications (including bidirectional peer-to-peer communication; positioning satellite communication, such as GPS; etc.), cellular communications, etc. Further, the internal communication subsystem 320 may be used to facilitate reception of data pertinent to telematics operations and/or operations of the main controller 300 as a whole. For example, the internal communication subsystem 320 may enable receiving (and providing the main processor 300 with) such data as location information (e.g., GPS positioning based location information), control signals (e.g., from telematics servers), software updates (e.g., from providers, operators, etc.), and the like.

The external 3rd party communication equipment 362 may be substantially similar to the internal communication subsystem 320. In this regard, the external 3rd party communication equipment 362 the may comprise suitable circuitry and/or other related hardware for handling wired and/or wireless communications. For example, the external 3rd party communication equipment 362 may comprise a transceiver configured to handle one or more of the wired and wireless technologies noted with respect to the internal communication subsystem 320. However, the external 3rd party communication equipment 362 may be a dedicated, off-the-shelf system, and may be legacy and 3rd party system. Nonetheless the external 3rd party communication equipment 362 may provide the same type of communications, particularly with respect to telematics related operations, as the internal communication subsystem 320. The external communication interface component 330 may be used to ensure compatibility with and operability of different types of components systems.

The main controller 300 may be operable to interact with local components and/or systems in conjunction with telematics related operations. In this regard, the telematics host component 350 may be configured to function as a telematics host (e.g., a CANBus based host), to enable the main controller 300 to communicate with other external components or equipment (e.g., the legacy 3rd party telematics unit $370_2$, external telematics unit 380, the next generation WCC unit 392, the next generation welding UI 394, the next generation machine UI 396, etc.), using CANBus based communication protocols for example, to provide telematics related data and/or control signals.

In operation, the main controller 300 may be configured to collect and process (format, process for communication, etc.) digital and analog telematics related data. The telematics related data may include location, machine status, service info, engine sensor data, error codes, and other data available to the main controller 300. The main controller 300 may obtained the data from the electronic ECU 364 (using the telematics client component 340 to interface therewith). In instances where the electronic ECU 364 may not be present or available to provide engine data 341, the main controller 300 may collect the information directly (e.g., by interacting with analog sensors 360). The main controller 300 may provide the telematics related data to other local components that would have obtained the data from the electronic ECU 364—e.g., the 3rd party telematics units $370_1$ and $370_2$, external telematics unit 380. The main controller 300 may also communicate that data to remote entities (e.g., telematics servers, such as server 31 of FIG. 1), such as using the internal communication subsystem 320 or 3rd party external communication components.

In some instances, the main controller 300 may format the telematics data into a single standard format, such that equipment or devices driven by a particular engine may have only a single communications standard to support. This may obviate the need to have the equipment or devices also support other providers' telematics units (e.g., the 3rd party telematics units $370_1$ and $370_2$). In other words, the main controller 300 may allow backward compatibility and/or compatibility with solutions by different providers, by performing the necessary digitization and telematics formatting "translation." For example, by processing the telematics data in the main controller 300, critical engine related data (e.g., information relating to engine coolant, engine oil, fuel, etc.) may be available digitally to 3rd party CANBus telematics units 3rd party telematics units $370_2$ in a single standardized format, simplifying installation by not having to splice into analog sensors. Further, the main controller 300 may also provide the additional benefit of supplying welding related data 301 in addition to traditional telematics data.

Where internal communication component (e.g., the internal communication subsystem 320) is used, no third party hardware is required, thus providing superior value and reliability through system simplicity. Nonetheless, by incorporating support of external communication equipment (e.g., by incorporating the external communication interface 330), compatibility with legacy and/or 3rd party provider communication components may be ensured in a cost-effective manner. Accordingly, the 3rd party communication equipment 362 may be easily and cost-effectively integrated using standard generic communications like TCP/IP, with the external communication interface 330 providing the necessary TCP/IP processing, to connect to the modem. The 3rd party communication equipment 362 may then allow remote connectivity, such as over the Internet, via satellite, cellular, WiFi, or any other wireless means.

In addition to the configuration illustrated in FIG. 3, other configurations may be used or implemented using only some of the elements shown in FIG. 3 (e.g., based on availability, user or provider preferences, etc.). FIGS. 4A through 7B show other, different configurations that may be used in providing control of integrated telematics, using only some of the components or equipment described or shown in FIG. 3.

Figure 4A:
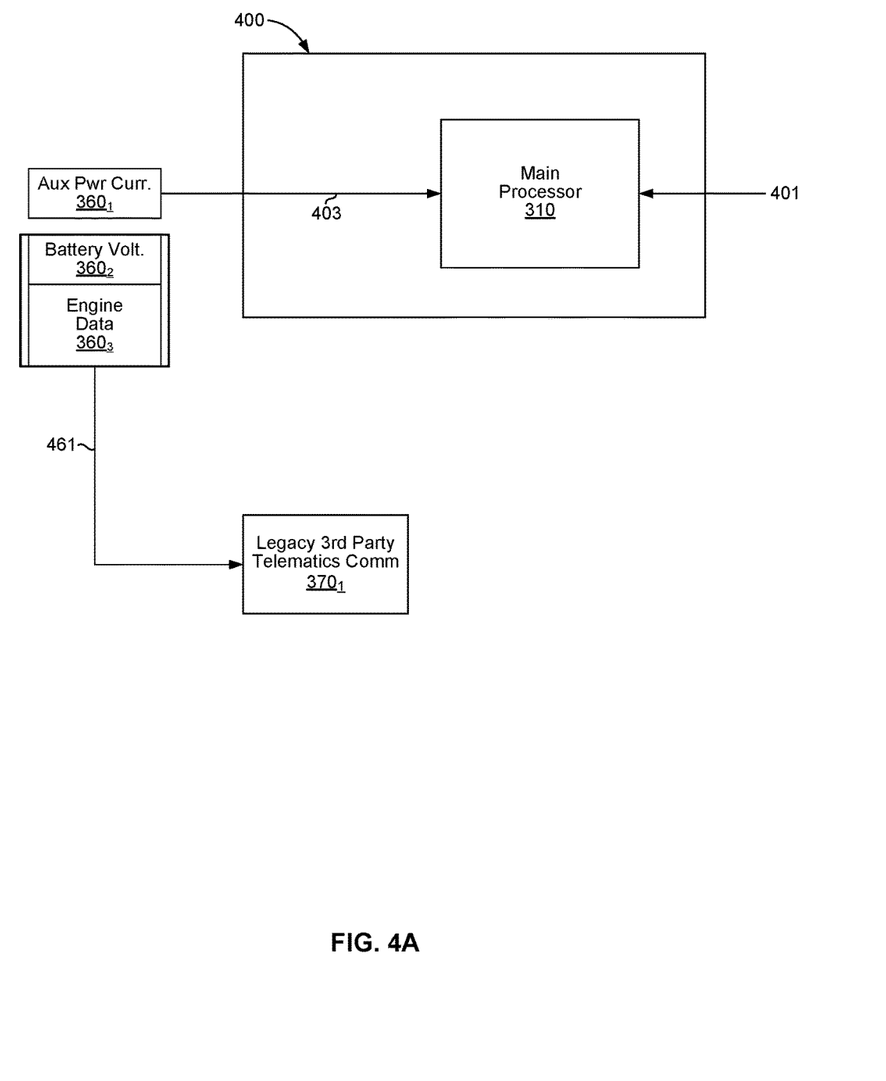
FIG. 4A is a block diagram illustrating an example configuration for controlling telematics integration using basic 3rd party telematics, and without engine control unit (ECU).

FIG. 4A is a block diagram illustrating an example configuration for controlling telematics integration using basic 3rd party telematics, and without engine control unit (ECU). Shown in FIG. 4A is a main controller 400, the sensors 360, and the legacy 3rd party telematics units $370_1$.

The main controller 400 may be similar to the main controller 300. However, the main controller 400 may have minimal implementation, comprising only the main processor 310. In the configuration shown in FIG. 4A, the main processor 310 may receive welding related data 401 (similar to the welding related data 301 of FIG. 3). Further, the main processor 310 may receive a telematics input 403, which may only comprise some of the telematics related sensory information generated by the sensors 360. For example, the telematics input 403 may comprise only sensory information corresponding to the auxiliary power transformer sensor $360_1$. Remaining telematics sensory data 461 (e.g., corresponding to battery voltage sensor $360_2$ and engine sensors $360_3$) may be provided, as analog input(s), to the legacy 3rd party telematics unit $370_1$.

Figure 4B:
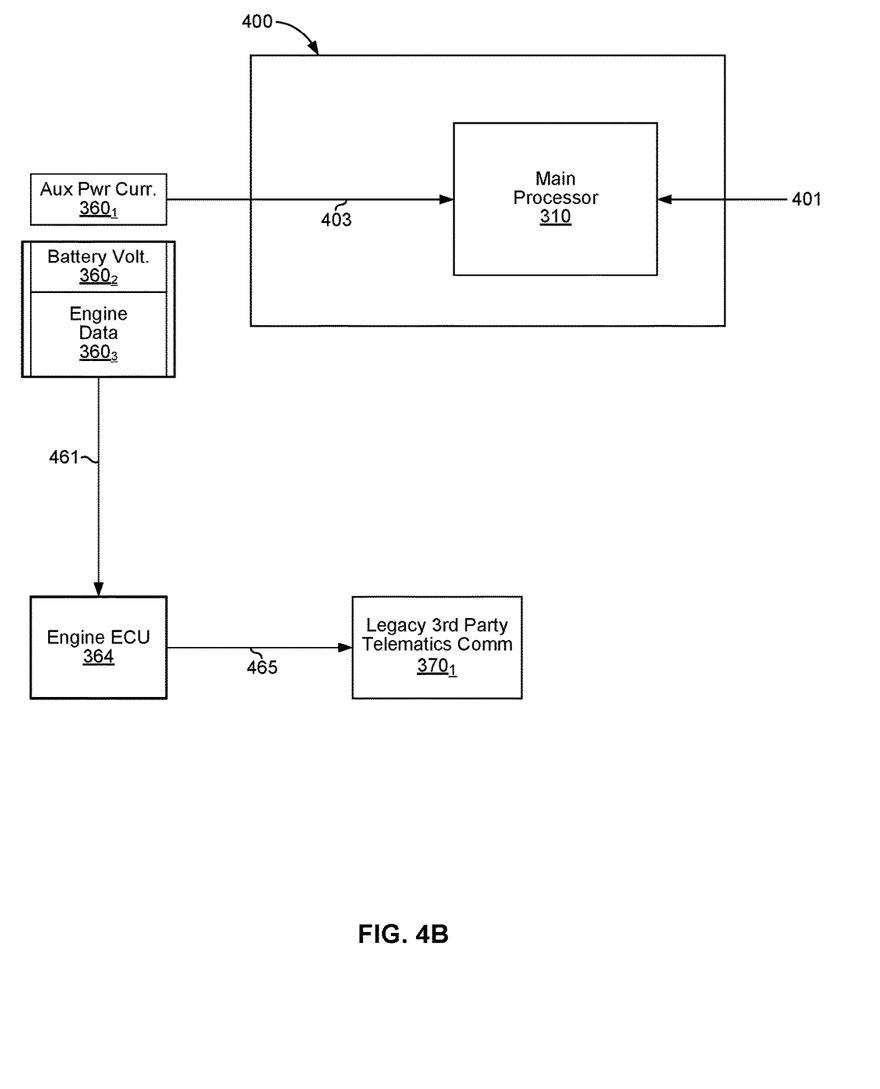
FIG. 4B is a block diagram illustrating an example configuration for controlling telematics integration using basic 3rd party telematics, and with engine control unit (ECU).

FIG. 4B is a block diagram illustrating an example configuration for controlling telematics integration using basic 3rd party telematics, and with engine control unit (ECU). Shown in FIG. 4B is the main controller 400, the sensors 360, the legacy 3rd party telematics units $370_1$, and the electronic ECU 364 of FIG. 3.

As with the configuration depicted in FIG. 4A, the main processor 310 may receive welding related data 301 and telematics input 303, comprising at least some of the telematics related sensory data generated by the sensors 360. The remaining telematics sensory data 361, however, may be sent to the electronic ECU 364, which may generate corresponding data (e.g., as CANBus signal) for input into the legacy 3rd party telematics unit $370_1$.

Figure 5A:
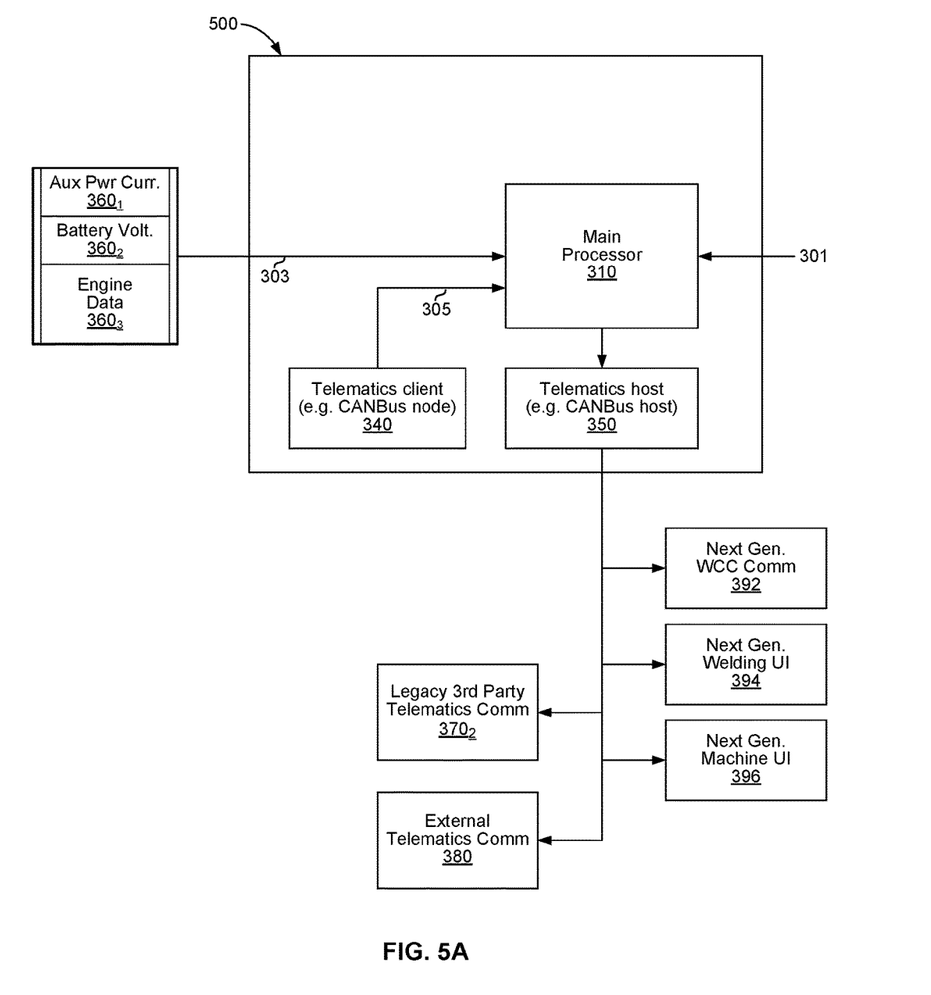
FIG. 5A is a block diagram illustrating an example configuration for controlling telematics integration using basic 3rd party telematics and telematics modules, and without engine control unit (ECU).

FIG. 5A is a block diagram illustrating an example configuration for controlling telematics integration using basic 3rd party telematics and telematics modules, and without engine control unit (ECU). Shown in FIG. 5A is a main controller 500, the sensors 360, the legacy 3rd party telematics units $370_2$, the external telematics unit 380, the next generation WCC unit 392, the next generation welding UI 394, and the next generation machine UI 396.

The main controller 500 may be similar to the main controller 300. However, the main controller 500 may have minimal implementation, comprising only the main processor 310, the telematics client component 340, and the telematics host component 350. In other words, in the configuration shown in FIG. 5A (and similarly the configuration shown in FIG. 5B), the main controller 500 lacks the communication resources (e.g., the internal communication subsystem 320 and the external communication interface component 330) needed to transmit the telematics related information to remote entities, whether using internal components or external equipment. Nonetheless, the main processor 310 may receive the welding related data 301 and the telematics related sensory data 303 (from all sensors 360). Thus, the main controller 500 may be operable to function as telematics host, providing telematics data (including welding related information) and related messaging (after processing and formatting) to local devices or equipment (e.g., the legacy 3rd party telematics units 370$_2$, the external telematics unit 380, the next generation WCC unit 392, the next generation welding UI 394, and the next generation machine UI 396).

Figure 5B:
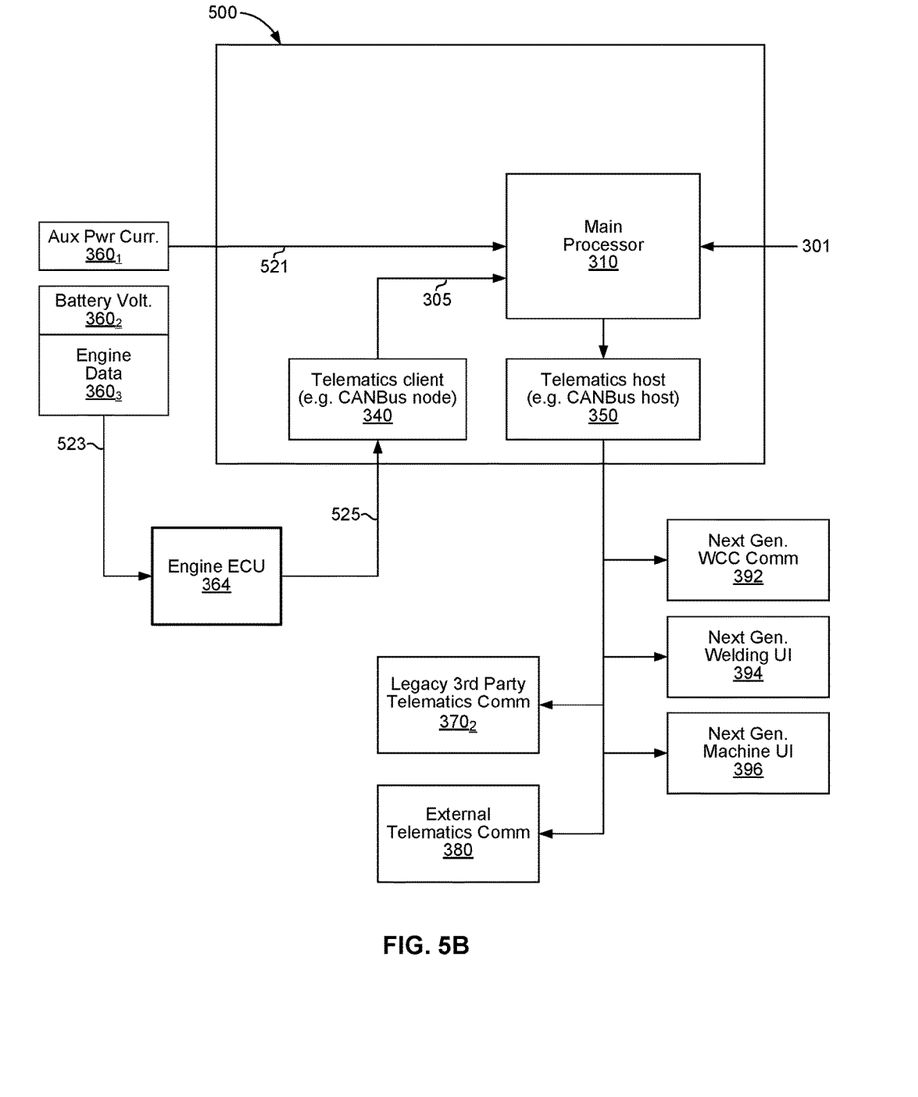
FIG. 5B is a block diagram illustrating an example configuration for controlling telematics integration using basic 3rd party telematics and telematics modules, and with engine control unit (ECU).

FIG. 5B is a block diagram illustrating an example configuration for controlling telematics integration using basic 3rd party telematics, and with engine control unit (ECU). Shown in FIG. 5B is the main controller 500, the sensors 360, the legacy 3rd party telematics units 370$_2$, the external telematics unit 380, the next generation WCC unit 392, the next generation welding UI 394, the next generation machine UI 396, and the electronic ECU 364 of FIG. 3.

As with the configuration depicted in FIG. 5A, the main processor 310 may receive welding related data 301. However, only some of the telematics sensory information (e.g., sensory information corresponding to the corresponding to the auxiliary power transformer sensor 360$_1$) may be provided directly to the main processor (as input signal 521). Remaining telematics sensory data 523 (e.g., corresponding to the battery voltage sensor 360$_2$ and the engine sensors 360$_3$), however, may be sent to the electronic ECU 364, which may generate corresponding data (e.g., as CANBus signal) for input, as input signal 525, into the main controller 500, via the telematics client component 340.

Figure 6A:
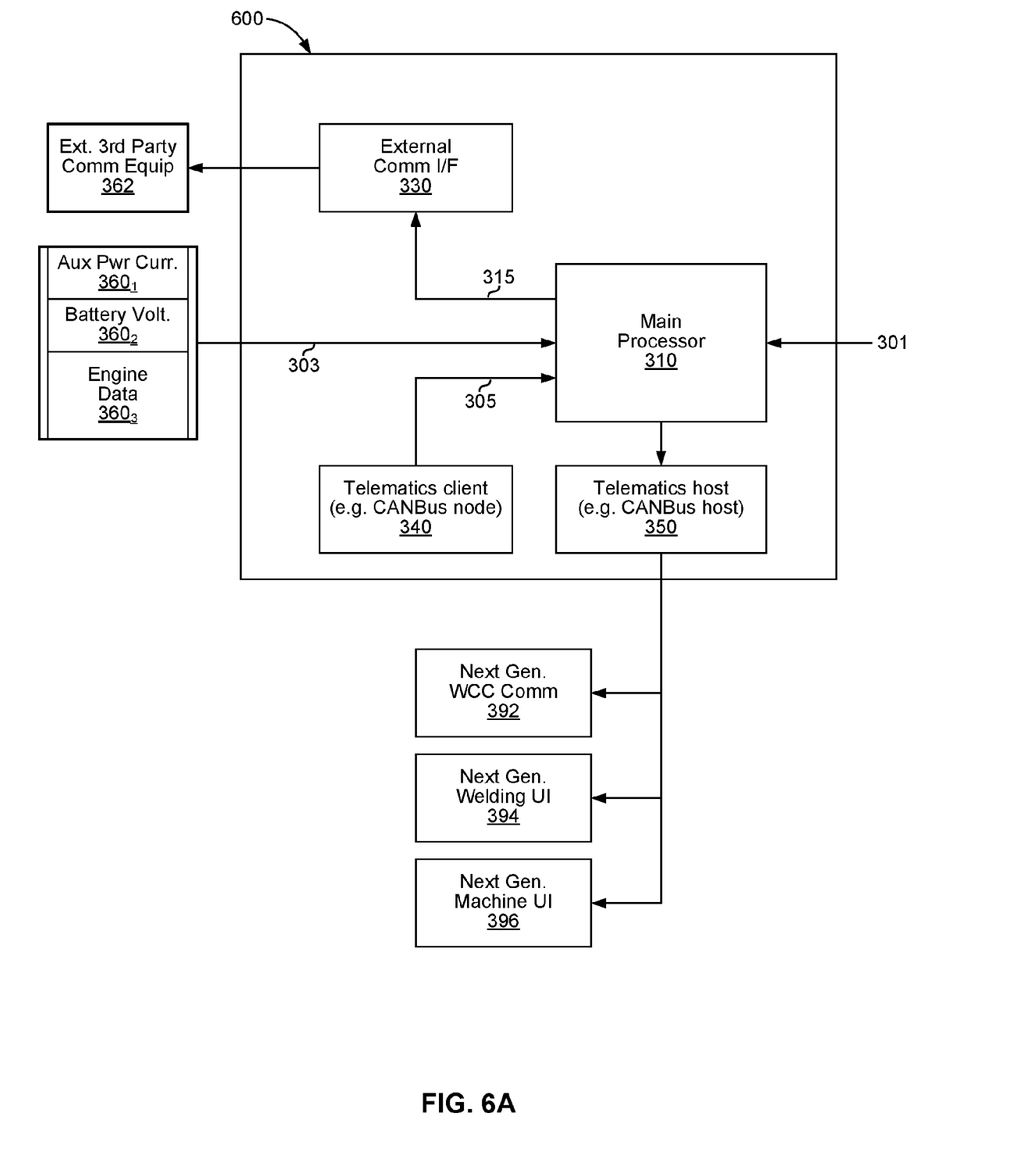
FIG. 6A is a block diagram illustrating an example configuration for controlling telematics integration using basic 3rd party wireless communication components, and without engine control unit (ECU).

FIG. 6A is a block diagram illustrating an example configuration for controlling telematics integration using basic 3rd party wireless communication components, and without engine control unit (ECU). Shown in FIG. 6A is a main controller 600, the sensors 360, the external 3rd party communication equipment 362, the legacy 3rd party telematics units 370$_2$, the external telematics unit 380, the next generation WCC unit 392, the next generation welding UI 394, and the next generation machine UI 396.

The main controller 600 may be similar to the main controller 300. However, the main controller 600 may be a reduced implementation, comprising only the main processor 310, the external communication interface component 330, the telematics client component 340, and the telematics host component 350. In other words, in the configuration shown in FIG. 6A (and similarly the configuration shown in FIG. 6B), the main controller 600 lacks internal/integrated communication resources (e.g., the internal communication subsystem 320) needed to autonomously transmit the telematics related information to remote entities and/or autonomously receiving data (e.g., location, control, software updates, etc.). Rather, communications can only be done using external communication resources, such as the external 3rd party communication equipment 362, which the main controller 600 may interact with using the external communication interface component 330. The main processor 310 may receive the welding related data 301 and the telematics related sensory data 303 (from all sensors 360). The main controller 600 may be operable to function as telematics host, providing telematics data (including welding related information) and related messaging (after processing and formatting) to local devices or equipment (e.g., the legacy 3rd party telematics units 370$_2$, the external telematics unit 380, the next generation WCC unit 392, the next generation welding UI 394, and the next generation machine UI 396).

Figure 6B:
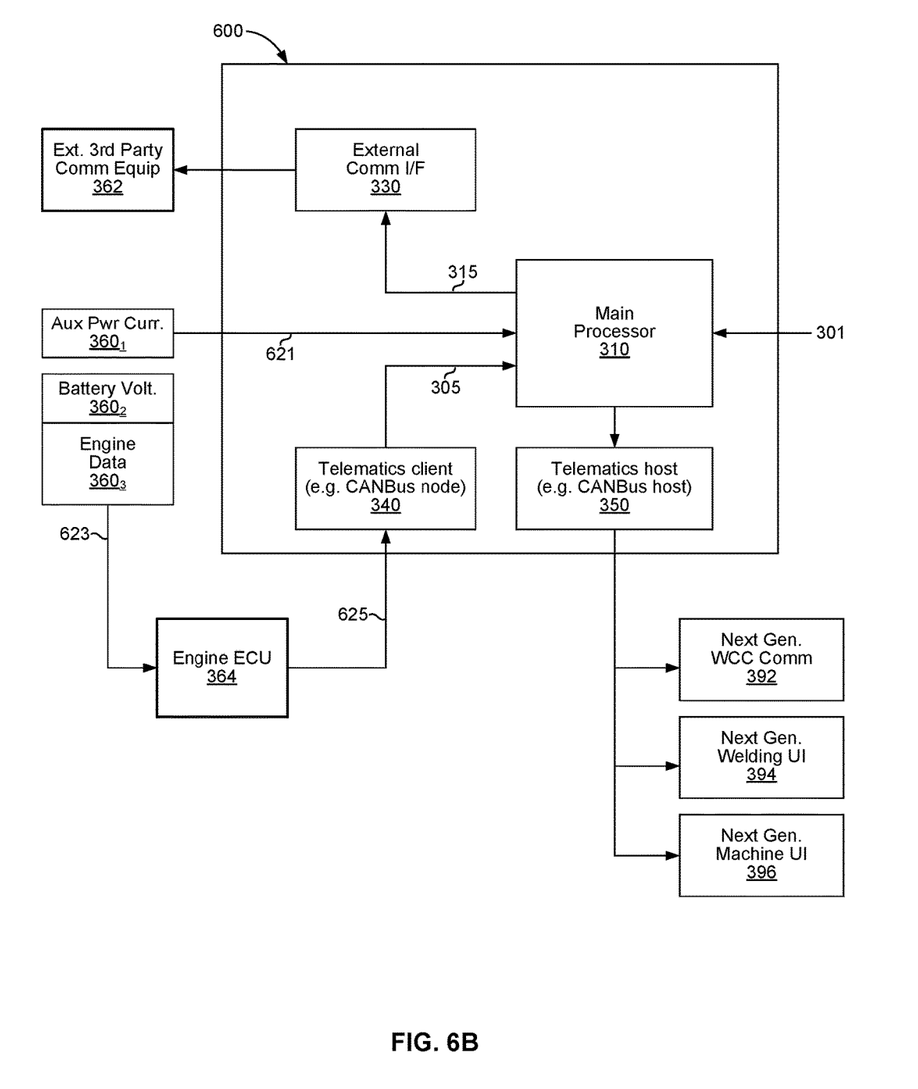
FIG. 6B is a block diagram illustrating an example configuration for controlling telematics integration using basic 3rd party wireless communication components and engine control unit (ECU).

FIG. 6B is a block diagram illustrating an example configuration for controlling telematics integration using basic 3rd party wireless communication components and engine control unit (ECU). Shown in FIG. 6B is the main controller 600, the sensors 360, the external 3rd party communication equipment 362, the legacy 3rd party telematics units 370$_2$, the external telematics unit 380, the next generation WCC unit 392, the next generation welding UI 394, the next generation machine UI 396, and the electronic ECU 364.

As with the configuration depicted in FIG. 6A, the main processor 310 may receive welding related data 301. However, only some of the telematics sensory information (e.g., sensory information corresponding to the corresponding to the auxiliary power transformer sensor 360$_1$) may be provided directly to the main processor (as input signal 621). Remaining telematics sensory data 623 (e.g., corresponding to the battery voltage sensor 360$_2$ and the engine sensors 360$_3$), however, may be sent to the electronic ECU 364, which may generate corresponding data (e.g., as CANBus signal) for input, as input signal 625, into the main controller 500, via the telematics client component 340.

Figure 7A:
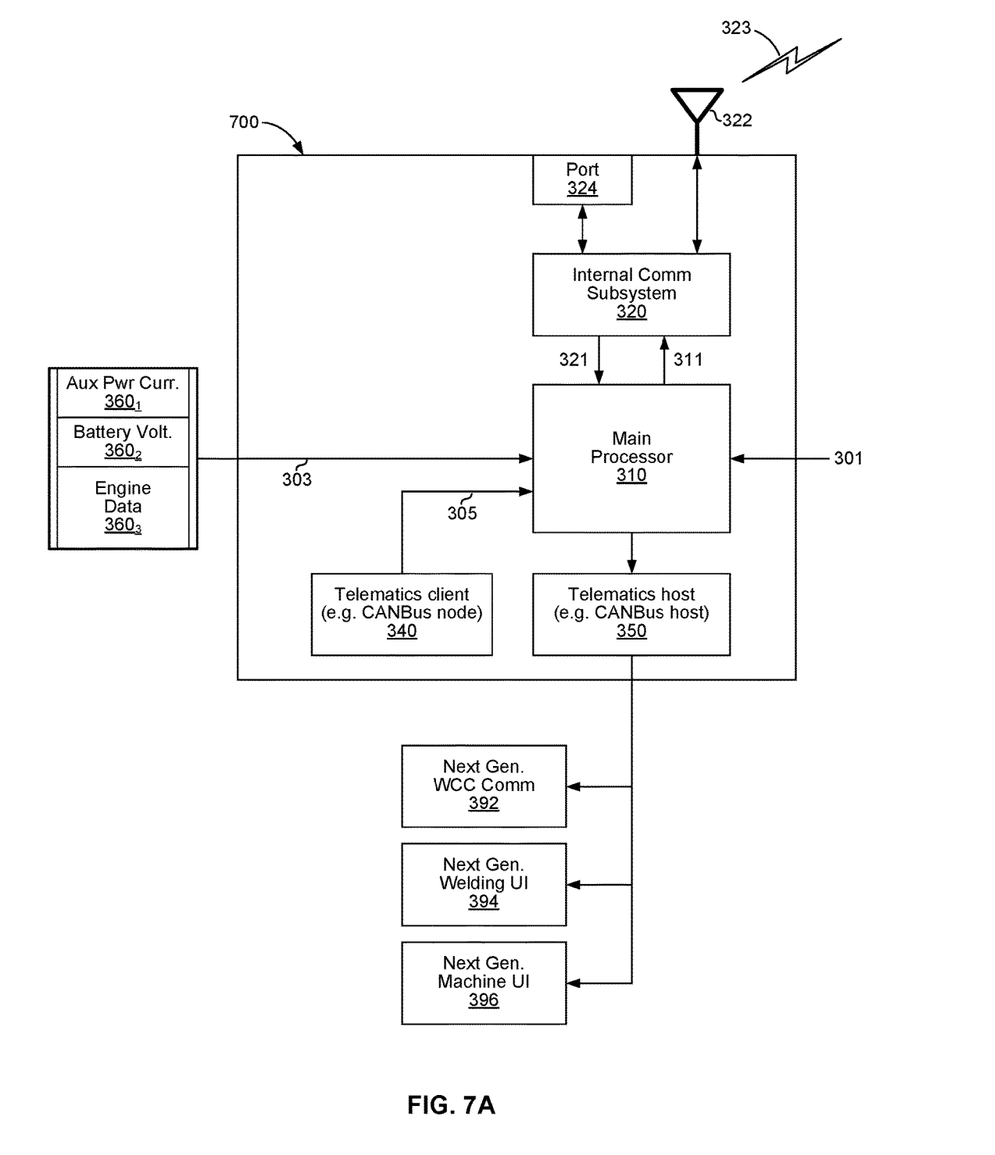
FIG. 7A is a block diagram illustrating an example configuration for controlling telematics integration using internal wireless communication components, and without engine control unit (ECU).

FIG. 7A is a block diagram illustrating an example configuration for controlling telematics integration using internal wireless communication components, and without engine control unit (ECU). Shown in FIG. 7A is a main controller 700, the sensors 360, the external 3rd party communication equipment 362, the legacy 3rd party telematics units 370$_2$, the next generation WCC unit 392, the next generation welding UI 394, and the next generation machine UI 396.

The main controller 700 may be similar to the main controller 300. However, the main controller 700 may be a reduced implementation, comprising only the main processor 310, the external communication interface component 330, the telematics client component 340, and the telematics host component 350. In other words, in the configuration shown in FIG. 7A (and similarly the configuration shown in FIG. 7B), the main controller 700 lacks capabilities to support use of external communication resources (e.g., the external 3rd party communication equipment 362). Instead, the main controller 700 only supports use of integrated communication resources (i.e., the internal communication subsystem 320), thus it would still enable autonomous transmission of the telematics related information to remote entities and/or autonomous reception of data (e.g., location, control, software updates, etc.).

The main processor 310 may receive the welding related data 301 and the telematics related sensory data 303 (from all sensors 360). The main controller 700 may be operable to function as telematics host, providing telematics data (including welding related information) and related messaging (after processing and formatting) to local devices or equipment (e.g., the legacy 3rd party telematics units 370$_2$, the external telematics unit 380, the next generation WCC unit 392, the next generation welding UI 394, and the next generation machine UI 396).

Figure 7B:
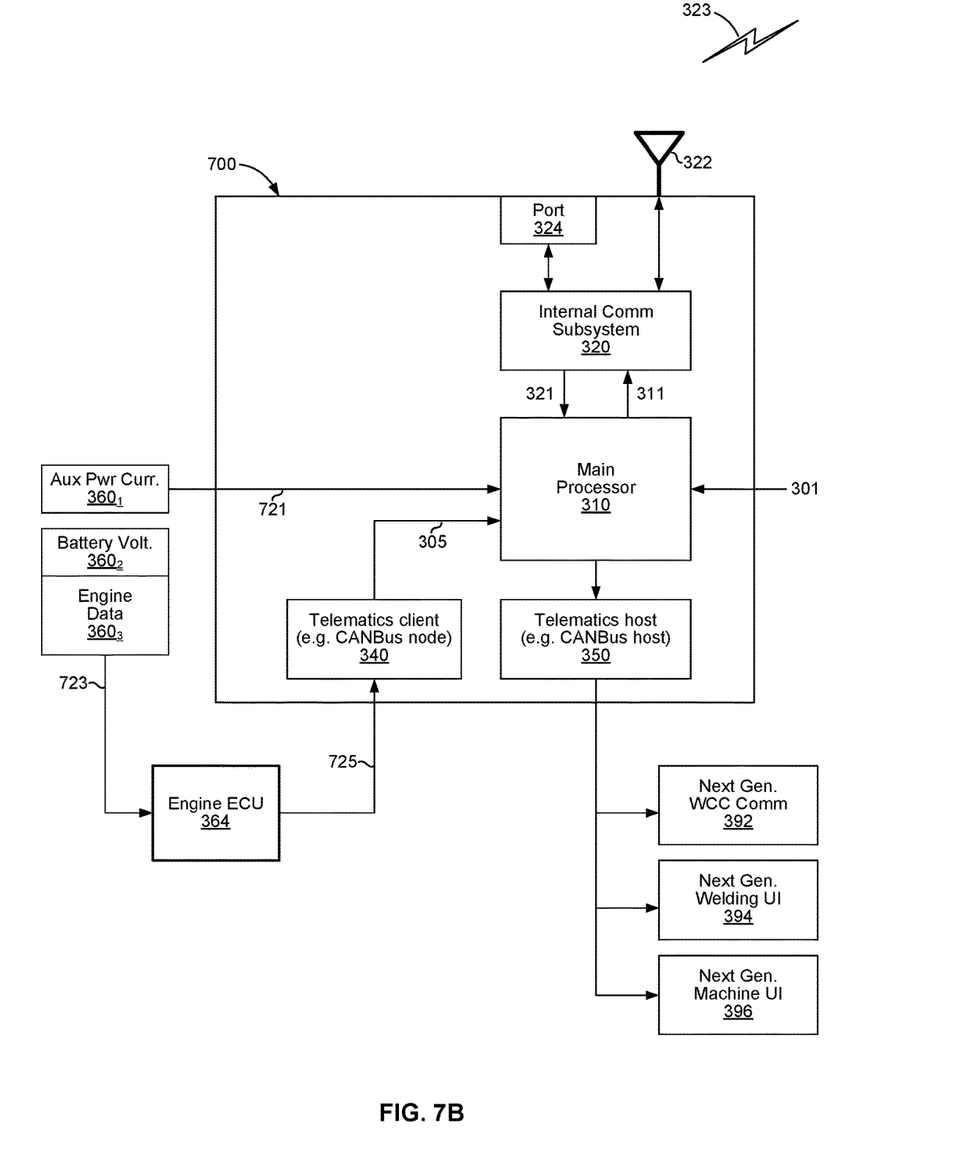
FIG. 7B is a block diagram illustrating an example configuration for controlling telematics integration using internal wireless communication components, and with engine control unit (ECU).

FIG. 7B is a block diagram illustrating an example configuration for controlling telematics integration using internal wireless communication components, and with engine control unit (ECU). Shown in FIG. 7B is the main controller 700, the sensors 360, the external 3rd party communication equipment 362, the legacy 3rd party telematics units 370$_2$, the external telematics unit 380, the next generation WCC unit 392, the next generation welding UI 394, the next generation machine UI 396, and the electronic ECU 364.

As with the configuration depicted in FIG. 7A, the main processor 310 may receive welding related data 301. However, only some of the telematics sensory information (e.g., sensory information corresponding to the corresponding to the auxiliary power transformer sensor 360$_1$) may be provided directly to the main processor (as input signal 721). Remaining telematics sensory data 723 (e.g., corresponding to battery voltage sensor 360$_2$ and engine sensors 360$_3$), however, may be sent to the electronic ECU 364. The ECU 364 may generate corresponding data (e.g., as CANBus signal) for input, as input signal 725, into the main controller 700, via the telematics client component 340.

The present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system may be described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "example" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed:

1. A system for use in welding-type operations, the system comprising:
    a welding supply source configured for providing welding outputs to drive a welding torch, the welding outputs comprising at least one of power or weld material;
    an engine for driving the system; and
    a controller configured to:
        interface directly with an engine control unit (ECU) of the engine;
        obtain telematics data comprising engine related data, wherein at least part of the telematics data is obtained from the ECU of the engine; and
        process the telematics data to enable use of the telematics data by a remote entity for at least one of remote monitoring or management of at least one component of the system.

2. The system of claim 1, wherein the controller is operable to obtain at least part of the telematics data from one or more analog sensors.

3. The system of claim 1, wherein the engine related data comprises information relating to at least one of engine coolant, engine oil, or engine fuel.

4. The system of claim 1, wherein the controller is operable to process the telematics data by formatting the telematics data in accordance with a single standard format regardless of source or type of obtained data.

5. The system of claim 1, wherein the controller is operable to process the telematics data by digitizing obtained analog data.

6. The system of claim 1, wherein the controller is operable to process the telematics data by processing the telematics data for communication to the remote entity in accordance with a wired or wireless interface, protocol, or standard.

7. The system of claim 1, wherein the controller is operable to function as at least one of a telematics client node or a telematics host node.

8. The system of claim 1, wherein the controller is operable to communicate telematics related messages at least one of with the engine, a component of the engine, or one or more components in accordance with a communication protocol.

9. The system of claim 8, wherein the communication protocol comprises controller area network (CANBus) protocol.

10. A system for handling telematics data associated with a welding-type arrangement, comprising:
    an interface component operable to receive telematics data; and
    a processing circuit operable to process the telematics data, to enable use of the telematics data by a remote entity,
    wherein:
        the telematics data comprises at least one of data relating to an engine used in driving one or more components of the welding-type arrangement;

the interface component is configurable to interface directly with an engine control unit (ECU) of the engine, and to obtain at least part of the telematics data from the ECU of the engine.

11. The system of claim 10, wherein the processing circuit is operable to format the telematics data in accordance with a single standard format regardless of source or type of obtained data.

12. The system of claim 10, wherein the processing circuit is operable to digitize obtained analog data.

13. The system of claim 10, wherein the controller comprises at least one of:
an internal communication component operable to at least one of configure, setup, or utilize at least one of wired or wireless connections, to the remote entity; and
an external communication interface component operable to connect the controller to an external communication device that provides at least one of wired or wireless connections to the remote entity.

14. The system of claim 13, wherein at least one of the processing circuit, the communication component, or the external communication interface component is operable to process the telematics data for communications via the wired or wireless connections to the remote entity.

15. The system of claim 10, wherein the controller comprises a telematics client component operable to perform telematics client node functions.

16. The system of claim 10, wherein the controller comprises a telematics host component operable to perform telematics host node functions.

17. The system of claim 10, wherein the controller comprises a telematics communication component operable to handle telematics related messaging in accordance with a particular telematics communication protocol.

18. The system of claim 17, wherein the telematics communication protocol comprises a controller area network (CANBus) protocol.

19. A method, comprising:
handling in a controller of a welding-type arrangement, telematics data associated with the welding-type arrangement, the handling comprising:
obtaining telematics data, wherein the telematics data comprises data relating to an engine used in driving one or more components of the welding-type arrangement, and wherein the obtaining comprises:
interfacing directly with an engine control unit (ECU) of the engine; and
obtaining at least part of the data relating to the engine from the ECU of the engine;
processing the telematics data comprises formatting the telematics data in accordance with a single standard format to enable use of the telematics data by a remote entity; and
communicating the telematics data to the remote entity.

* * * * *